United States Patent [19]

McDonald

[11] Patent Number: 4,917,431
[45] Date of Patent: Apr. 17, 1990

[54] LINER FOR VAN CARGO COMPARTMENT

[75] Inventor: Dean McDonald, Grand Blanc, Mich.
[73] Assignee: Durakon Industries, Inc., Lapeer, Mich.
[21] Appl. No.: 245,085
[22] Filed: Sep. 16, 1988
[51] Int. Cl.[4] .............................................. B62D 33/00
[52] U.S. Cl. ................................. 296/39.1; 296/39.3
[58] Field of Search ..................... 296/39.1, 39.3, 39.2
[56] References Cited

U.S. PATENT DOCUMENTS

| | | | |
|---|---|---|---|
| 2,898,146 | 8/1959 | Yudenfreund | 296/39.1 |
| 3,653,710 | 4/1972 | Barnard | 296/39.1 |
| 4,047,749 | 9/1977 | Lambitz | 296/39.2 |
| 4,765,671 | 8/1988 | Allen | 296/39.2 |

Primary Examiner—Robert R. Song
Attorney, Agent, or Firm—Dykema Gossett

[57] ABSTRACT

A protective liner assembly for the cargo compartment of an automotive van comprising a plurality of polyethylene panels for the floor, side walls, doors and ceiling. The liner assembly includes a floor assembly, a ceiling assembly and right and left wall assemblies. Each of the wall assemblies include vertically spaced apart ribs which extend the longitudinal extent of the assemblies for providing strength and impact protection. One of the side wall assemblies includes multiple panels which may be adjusted to compensate for dimensional variations. Similarly, the ceiling assembly includes multiple panels which are adjustable relative to each other with the panels being secured to the ceiling of the cargo compartment by a flexible fastening assembly. Thus, the liner assembly provides protection to the cargo walls and insulation against road noises and the like.

5 Claims, 2 Drawing Sheets

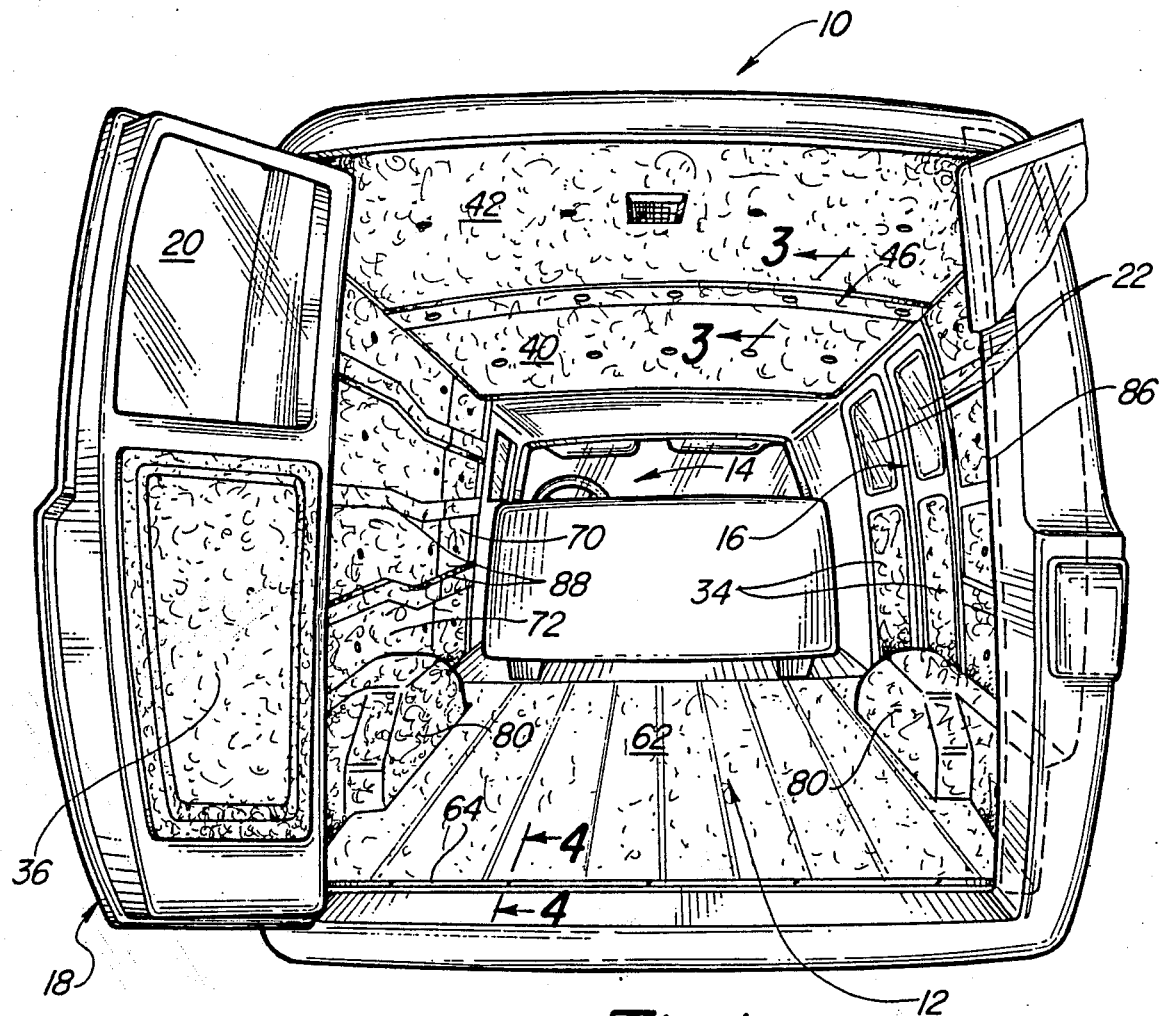
Fig-1
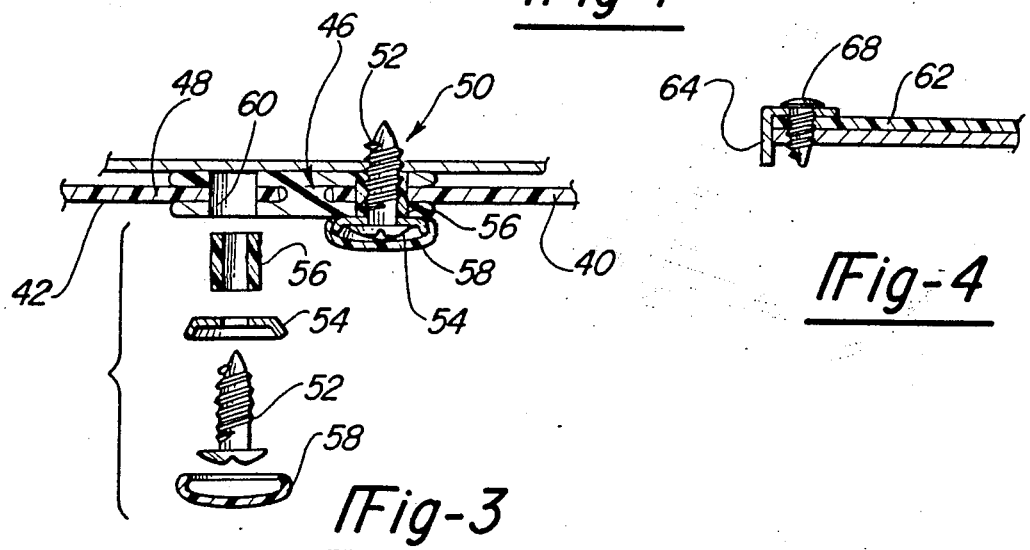
Fig-3
Fig-4

LINER FOR VAN CARGO COMPARTMENT

BACKGROUND OF THE INVENTION

This invention relates to a protective liner arrangement for covering the inside of the cargo compartment of an automotive van.

Modern automotive vans are often used to transport cargo. A typical cargo van consists of a forward cab portion and a cargo compartment. The van typically will have rear doors and side doors into the cargo compartment. Heavy tools, building materials and other heavy items are typically carried in the cargo compartment. While transporting these items, they often bounce and can cause denting or damage to the sheet metal walls, floor or ceiling. Further, the cargo compartment of a cargo van is not typically insulated against noise and outside temperature extremes.

Thus, it is an object of the present invention to provide a protective liner arrangement for use in the cargo compartment of an automotive van that will protect the cargo walls against damage from impact received from the contents of the cargo compartment, and also insulate the cargo compartment.

It is a further object of the present invention to provide a van liner that can be adjusted easily so that it will fit cargo compartments having dimensional variations.

Another object of the present invention is to provide a liner arrangement for a vehicle van that can flex relative to the walls of the cargo compartment.

Moreover, it is an object of the present invention to provide a relatively simple arrangement of protective liner panels for the floor, sides and doors of a cargo compartment.

SUMMARY OF THE INVENTION

The liner of the present invention comprises a multi-piece panel assembly that can be adjustably mounted to fit the particular dimensions of the cargo compartment of an automotive van. The panels of the multi-piece liner assembly are preferably formed of polyethylene since this material has high impact strength. In addition, polyethylene is relatively easy to mold into the required shapes. The finished liner panel members will preferably have a leather-like texture and polyethylene is particularly advantageous for forming such a detailed surface.

The multi-piece liner assembly can be envisioned as a series of subassemblies. There is a floor assembly consisting of a main floor panel that is flat and extends from the van's rear door longitudinally forward to the back of the vehicle cab and from the van's left wall laterally to the right wall. The floor assembly may include fasteners that secure the floor panel at the rear and side door openings. A left wall assembly comprises a left front panel and a left rear panel. The left front panel extends from the back of the vehicle cab longitudinally rearward to a position approximately at the midpoint of the cargo compartment. At the rearwardmost extent of the left front panel is an adjustment groove for adjustably receiving the left rear panel.

The left rear panel extends from the van's rear doors forwardly to a point overlapping the adjustment groove of the left front panel. At the rearward extent of the left rear panel, a rear flange is formed that extends laterally inwardly towards the right van wall. This flange covers the portion of the rear wall laterally between the left extent of the rear doors and the left wall. A molding is disposed on the innermost extent of this flange. The left rear panel has an integral wheel well cover that extends laterally inwardly towards the right wall.

Both the front and rear left panels extend from the van's ceiling vertically downwardly to the van's floor. A base flange portion is formed along the entire lowermost extent of both panels, and the base flange portion extends inwardly to form a lip for overlapping the floor panel. A top flange extends along the entire extent of the uppermost edge of the left panels. Ribs extend longitudinally along both panels to provide strength and to act as a deflector.

The right wall assembly comprises a single panel that extends from the rear doors forwardly to the van's side doors and vertically from the ceiling to the floor. The right wall panel also includes the integral wheel well cover, base flange, top flange, and longitudinally extending rib features of the left wall assembly. Further, the right wall panel comprises a rear flange extending laterally inwardly towards the left wall to cover the rear wall portion laterally between the rear doors and the right wall. Moldings are placed on the end of this flange and at the forward end of the panel.

The left wall assembly is mounted by securing the left front panel at a position where it will cover the cargo compartment forwardly to the rear of the van's cab. The left rear panel is then placed in the left front panel adjustment groove and is moved until it contacts the rear wall of the cargo compartment. The left rear panel is then secured and the molding is attached. Similarly, the right wall panel is secured to the right wall of the cargo compartment and moldings are attached.

The ceiling assembly comprises a front ceiling panel and a rear ceiling panel separated by an elongated, intermediate spacer bar. The spacer bar adjustably receives and supports both panels. The front panel extends from the van's cab rearwardly and the rear panel extends from the van's rear doors forwardly. The spacer bar receives and connects the panel sections.

A unique fastener assembly connects the spacer bar and the ceiling panels to the van's ceiling. Openings are formed through both the spacer bar and the ceiling panels, and sleeves extend through the openings. A fastener and collar arrangement yieldingly engage and extend through each sleeve for securing the spacer bar and panels. The ceiling assembly is mounted by placing the front or rear ceiling panel in the spacer bar and securing the panel at a desired position. The other one is then placed in the spacer bar and adjusted to its desired position. The spacer bar adjustably receives both panels and can be moved to allow the panels to completely cover the ceiling.

When the desired positions of the panels are attained, holes are drilled through the panels and a respective sleeve is then placed in each hole and a screw and collar is inserted through the sleeve. The screw is tightened until it secures itself in the van's sheet metal. A cap is then placed over the screw head. This mounting allows the ceiling liner to move slightly with respect to the van's ceiling since the screw is not attached to the liner but merely supports it.

Further objects and features of the present invention will be better understood upon consideration of the attached drawings and the detailed descriptions thereof which follow.

BRIEF DESCRIPTION OF THE DRAWINGS

FIG. 1 is a perspective view showing the interior of the vehicle van from the rear doors and including the multiple piece liner assembly of the present invention.

FIG. 3 is a cross-sectional view of the mounting assembly for the roof panels of the van liner of the present invention taken along line 3—3 in FIG. 1.

FIG. 4 is a cross-sectional view of the mounting means for floor panel of the present invention taken along line 4—4 in FIG. 1.

DETAILED DESCRIPTION OF THE INVENTION

Figure 2:
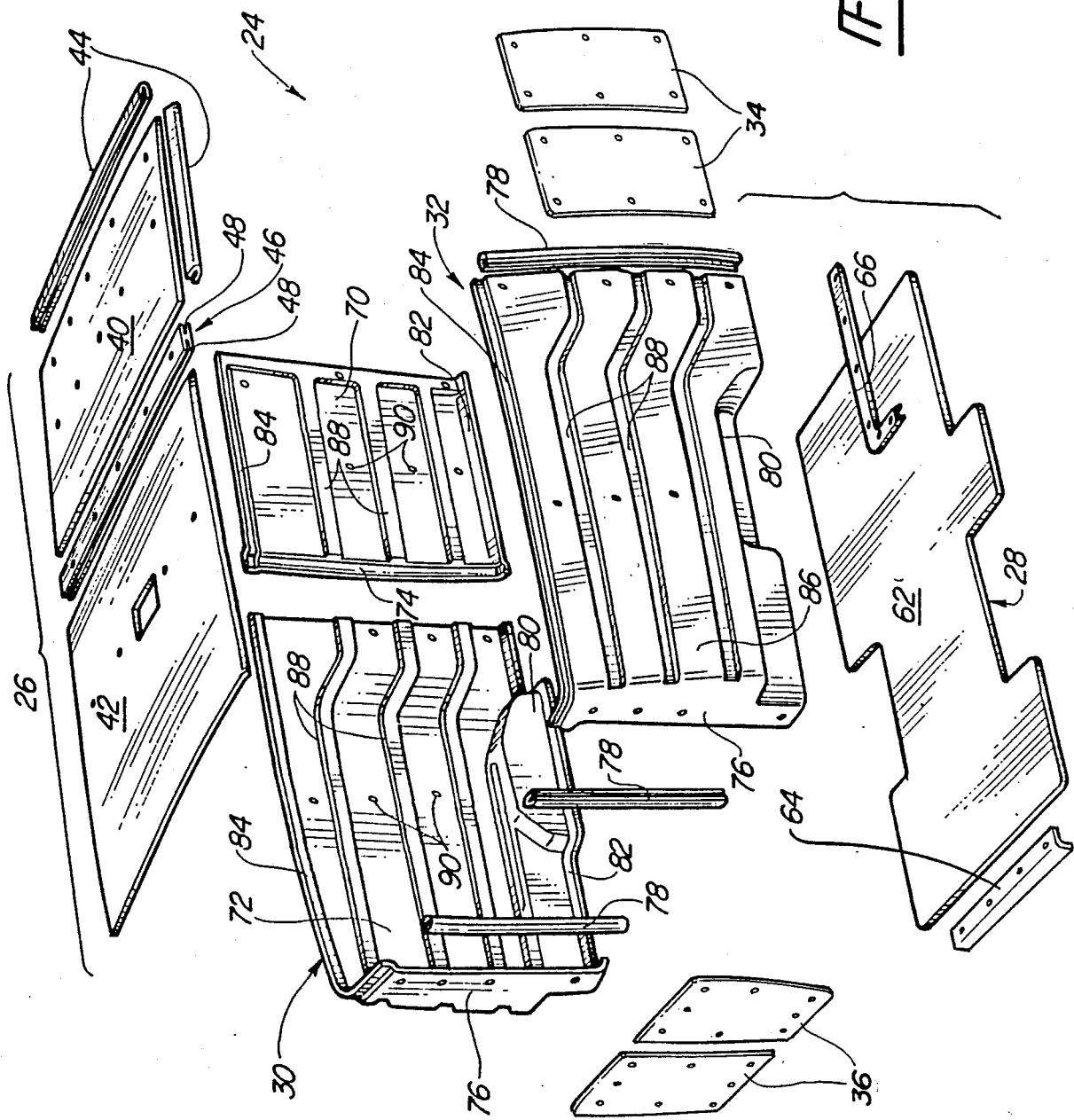
FIG. 2 is an assembly view showing the various components of the van liner assembly of the present invention.

Referring now to FIG. 1, an automotive van 10 of conventional design is shown having a cargo compartment 12 behind a cab 14 where the drivers and passengers sit. As is conventional, the left side of the cargo compartment 12 has an uninterrupted side wall while the right side of the cargo compartment has a door entry 16 and a side wall to the rearward end of the van. At the rear of the cargo compartment 12, there are rear doors 18 which are hinged to the sides of the van for the purpose of permitting access to the interior of the cargo compartment from the rear of the van. The rear doors 18 have window portions 20 while the side doors 16 have window portions 22.

In accordance with the present invention, the interior of the cargo compartment 12 is provided with a liner assembly 24 for protecting the cargo walls against damage from impact and to insulate the cargo compartment. The liner assembly 24 extends from the rear doors 18 forwardly to the vehicle cab 14 such that each of the sheet metal portions of the cargo compartment 12, including the floor, side walls, ceiling and lower door portions, are protected.

Referring to FIG. 2, it can be seen that the liner assembly 24 includes a ceiling assembly 26, a floor assembly 28, a left wall assembly 30, and a right wall assembly 32. Further, there are panels 34 which are mounted at the lower portions of the side doors 16 and panels 36 which are mounted at the lower portions of the rear doors 18.

The ceiling assembly 26 comprises a forward ceiling panel 40 and a rear ceiling panel 42. Moldings 44 are disposed along the front and side edges of panel 40 to define finished areas at those locations. A spacer member 46 is disposed between the forward and rear ceiling panels 40, 42 for the purpose of allowing the ceiling panels to be adjustably mounted so as to account for variations in the manufactured dimensions of the cargo compartment. Slots 48 are provided in spacer member 46 for receiving the front and rear ceiling panels 40, 42 so that the installer can adjust the longitudinal positions of the front and rear ceiling panels relative to the ceiling of the cargo compartment.

As shown in FIG. 3, a fastener assembly 50 is provided for mounting the ceiling assembly at the spacer bar location. The fastener assembly comprises a sheet metal screw 52, a collar 54, a sleeve 56 and a covering cap 58. When the panels 40 and 42 are positioned in their desired location, holes 60 are drilled through the panels and sleeves 56 are inserted therein. Sheet metal screw 52 is inserted through a respective collar 54 and tightened until it secures itself in the sheet metal ceiling of the van. Cap 58 is then placed over the screw head. This mounting system permits some flexing of the ceiling panels 40 and 42 since the screws 52 support the panels but are not attached to them.

The vehicle floor liner assembly 28 includes a main floor panel 62 that is configured with cutouts, as shown in FIG. 2, to prevent interference with the existing wheel wells in the van cargo compartment. A rear floor panel clamp 64 is provided to secure the rear of panel 62 to the floor of the van. Similarly, a side floor panel clamp 66 is provided for securing the panel 62 near the opening provided by the side doors 16. As shown in FIG. 4, the rear floor panel clamp 64 is secured to the floor of the van by means of conventional sheet metal screw fasteners 68. In a similar fashion, the side floor panel clamp 66 is secured to panel 62 and the floor of the van.

The left side panel assembly 30 consists of a left front panel 70 and a left rear panel 72. The left front panel 70 extends from the back of the vehicle cab 14 rearwardly to a position approximately at the midpoint of the cargo compartment 12. At the rearwardmost extent of the left front panel 70 is an adjustment groove 74 for adjustably receiving the left rear panel 72. The left rear panel 72 extends from the van's rear doors 18 forwardly to a point overlapping the adjustment groove 74 of the left front panel 70. The rearward extent of the left rear panel 72 includes a rear flange portion 76 which extends laterally inwardly towards the right side of the van. The flange portion 76 covers that part of the rear wall of the van that is between the respective rear door 18 and the left wall of the van. A molding 78 is provided for the end of flange portion 76 to finish the installation. Further, the left rear panel 72 includes an integral wheel well cover 80 that extends laterally inwardly towards the right wall of the van.

Both the front and rear left panels 70 and 72 extend from the van's ceiling vertically downwardly to the van's floor. A base flange portion 82 is formed along the entire lowermost extent of both panels and extends inwardly to form a lip for overlapping the floor panel 62. Further, a top flange portion 84 extends along the entire extent of the uppermost edges of the left panels 70 and 72 for overlapping the ceiling panels 40 and 42.

The right side panel assembly 32 comprises elements similar to the left side panel assembly 30. The right side panel assembly 32 includes a right side panel 86 that extends from the rear doors 18 forwardly to the van side doors 16 and vertically from the ceiling to the floor. The right wall panel 86 also includes the integral wheel well cover 80, base flange 82 and top flange 84. Further, the right wall panel 86 includes a rear flange portion 76 which extends laterally inwardly towards the left wall of the van to cover the van wall portion that is between the right wall of the van and the right rear door 18. Similarly, moldings 78 are installed on opposite ends of the right side panel 86 for the purpose of covering the ends of the panel to provide a finished appearance.

Each of the side wall panels 70, 72 and 86 is provided with a plurality of vertically spaced apart, generally parallel ribs 88 which extend along the longitudinal extent of each panel to provide strength to the panels and to act as deflectors and impact absorbers in the event that cargo is brought into engagement with the side walls.

The panel assembly 24 is generally installed in the cargo compartment 12 of van 10 as follows. The floor panel assembly 28 is initially positioned onto the floor of the cargo compartment 12. The floor panel 62 is appropriately positioned on the floor and the panel clamps 64 and 66 are secured to the panel 62 and floor of the van. In assembling the left panel assembly 30, the front panel 70 may be mounted to the left wall of the van by using sheet metal screws which extend through openings 90 in each of the panels 70, 72 and 86. The rear panel 72 can be adjusted such that its forward end engages within groove 74 and its rear end abuts the rear wall of the van. After the desired position is attained, conventional sheet metal screws are inserted through the openings 90 for securing the panel to the van and molding 78 is installed on the end of panel 72 for providing a finished edge. In a similar fashion, the right side assembly 32 is mounted to the right wall of the van cargo compartment 12 and panels 34 and 36 are installed on the lower portions of doors 16 and 18.

As set forth above, the front and rear ceiling panels 40 and 42 can be longitudinally adjusted with the spacer bar 46 so as to provide the appropriate fit relative to the side wall panels. Further, the fastener assembly 50 permits some flexibility to accommodate warpage, expansion and contraction of the components.

Thus, the liner assembly 24 of the present invention protects the cargo compartment 12 from damage due to impact with the floor, sides, ceiling or doors of the van's interior. Further, the liner assembly is adaptable to dimensional variations in the cargo compartment. Moreover, the assembly insulates the cargo compartment against road noise and the like.

As will be known by those skilled in the art, the foregoing disclosure is exemplary, rather than limiting, with the invention being further defined by the appended claims.

I claim:

1. A protective liner assembly for an automotive van that includes a cab portion and a cargo compartment defined by a ceiling, a floor, right and left side walls having wheel wells, rear doors and at least one side door, said liner assembly comprising:

a floor panel substantially covering the floor of the cargo compartment and said floor panel including portions for accommodating the wheel wells of the van;

a left side panel assembly substantially covering the left side wall of the van cargo compartment and extending from the floor of the van to the ceiling of the van;

a right side panel assembly substantially covering the right side wall of the van cargo compartment and extending from the floor of the van to the ceiling of the van;

said right and left side panel assemblies including wheel well covers which conform with the wheel wells of the van; and said right and left side panel assemblies including a plurality of vertically spaced apart ribs;

a ceiling panel assembly which is secured to the ceiling of the cargo compartment, said ceiling assembly comprising a forward ceiling panel, a rear ceiling panel and an intermediate spacer bar member, wherein said spacer bar member permitting longitudinal adjustments of the forward and rear ceiling panels relative to each other; and wherein said spacer bar member includes forward and rear slots that receive end portions of the forward and rear ceiling panels such that the forward and rear ceiling panels may be adjusted within the slots to a desired location.

2. The liner assembly as defined in claim 1 including a fastener assembly for securing the forward and rear ceiling panels and spacer bar member to the ceiling of the cargo compartment, said fastener assembly including a sleeve that extends through an opening in one of the spacer bar member slots and an end portion of one of the ceiling panels, and a fastener member extending through said sleeve and into engagement with the ceiling of the cargo compartment such that the fastener assembly provides a flexible attachment.

3. The liner assembly as defined in claim 1 wherein said left side panel assembly comprises a forward panel and a rear panel, an adjustment groove being provided in either the forward or rear panel, and said forward and rear panels engaging each other at the adjustment groove.

4. The liner assembly as defined in claim 1 wherein the left and right side panel assemblies include lower flanges that extend laterally inwardly to overlie the floor panel, a ceiling assembly comprising a forward ceiling panel, a rear ceiling panel and an intermediate spacer bar member, and wherein said left and right side panel assemblies include top flanges that extend inwardly to abut edges of the ceiling panels.

5. The liner assembly as defined in claim 1 wherein the left and right side panel assemblies include integral wheel well covers and rear flange portions that extend inwardly from the right and left side walls of the cargo compartment for providing protection to the cargo compartment in an area between the rear doors and the side walls of the cargo compartment.

* * * * *